United States Patent [19]
Kistner et al.

[11] Patent Number: 5,980,992
[45] Date of Patent: Nov. 9, 1999

[54] FLUOROCHEMICAL TREATMENTS TO PROVIDE LOW-ENERGY SURFACES

[75] Inventors: John F. Kistner; Thomas M. Milbourn, both of St. Paul, Minn.

[73] Assignee: 3M Innovative Properties Company, St. Paul, Minn.

[21] Appl. No.: 08/943,638

[22] Filed: Oct. 3, 1997

[51] Int. Cl.⁶ ............................................. B05D 3/02
[52] U.S. Cl. ................ 427/384; 427/387; 427/393.5; 427/12.1; 428/447
[58] Field of Search ................... 427/384, 387, 427/389.7, 393.5, 412.1; 428/447

[56] References Cited

U.S. PATENT DOCUMENTS

| | | |
|---|---|---|
| 2,681,294 | 6/1954 | Beguin . |
| 2,803,615 | 8/1957 | Ahlbrecht et al. . |
| 2,841,573 | 7/1958 | Ahlbrecht et al. . |
| 3,787,351 | 1/1974 | Olson . |
| 3,955,035 | 5/1976 | Ito et al. . |
| 4,049,861 | 9/1977 | Nozari . |
| 4,101,513 | 7/1978 | Fox et al. . |
| 4,156,046 | 5/1979 | Lien et al. . |
| 4,415,615 | 11/1983 | Esmay et al. . |
| 4,445,458 | 5/1984 | O'Brien . |
| 4,560,599 | 12/1985 | Regen . |
| 4,853,737 | 8/1989 | Hartley et al. . |
| 5,066,712 | 11/1991 | Lewis . |
| 5,242,972 | 9/1993 | Negishi et al. . |
| 5,274,159 | 12/1993 | Pellerite et al. ................... 556/485 |
| 5,380,365 | 1/1995 | Hishburg . |
| 5,380,644 | 1/1995 | Yonkoski et al. ................... 430/617 |
| 5,468,812 | 11/1995 | Muggli et al. . |
| 5,827,369 | 10/1998 | Tobari et al. ................... 118/410 |

FOREIGN PATENT DOCUMENTS

| | | |
|---|---|---|
| 373 866 A2 (A3) | 6/1990 | European Pat. Off. . |
| 401 496 A2 | 12/1990 | European Pat. Off. . |
| 581 962 A1 | 2/1994 | European Pat. Off. . |
| 40 10 881 A1 | 10/1990 | Germany . |
| 3-109482 | 5/1991 | Japan . |
| 8-143789 | 6/1996 | Japan . |
| 9001028 | 1/1997 | Japan . |

OTHER PUBLICATIONS

Bekhli et al., "The Surface–active Properties of Fluorine–containing Acrylate esters", translated from Zhurnal Fizicheskol Khimii (Russian Journal of Physical Chemistry), 56(11):1786–1787 (1982).

Material Safety Data Sheet "FC–405 3M™ Brand Fluorochemical Surfactant", 5 pgs (Aug. 22, 1996).

Material Safety Data Sheet "L–13117 Developmental Material", 4 pgs (Aug. 2, 1993).

*Primary Examiner*—Erma Cameron
*Attorney, Agent, or Firm*—Robert W. Sprague; Floise J. Maki

[57] ABSTRACT

A process for treating silicon-containing organic polymeric surfaces (e.g., spent, fluorosilane-containing, low-energy coatings) including applying a treatment composition comprising a fluorochemical compound. Preferably, the fluorochemical compound is a fluorinated silane having the following formula:

$$R_f\text{—L—}SiX_{3-x}(R_a)_x$$

wherein: $R_f$ is a fluoroaliphatic group containing a perfluorinated terminal group; L is a covalent bond, a heteroatom, or an organic linking group; $R_a$ is an alkoxy group, an alkyl group, or an acyloxy group; X is a halide; and x is 0 to 3, with the proviso that when $R_a$ is an alkyl group, x is not 3.

45 Claims, No Drawings

FLUOROCHEMICAL TREATMENTS TO PROVIDE LOW-ENERGY SURFACES

FIELD OF THE INVENTION

The present invention relates to fluorochemical treatments to provide low-energy surfaces. More particularly, the present invention relates to treatments for silicon-containing organic polymeric surfaces, such as fluorosilane-containing low surface energy coatings used on articles such as dies, edge guides, nozzles, etc., to restore repellency properties after that of the original coating begins to fail.

BACKGROUND OF THE INVENTION

Fluorosilane-containing low-energy coatings (i.e., low surface energy coatings), such as those described by Milbourn et al. in U.S. patent application Ser. No. 08/659,053, filed May 31, 1996, are used on articles, such as coating apparatuses and fluid-contacting components (e.g., extrusion dies and edge guides), to reduce the amount of streaking and to reduce the amount of material (e.g., solute) build-up during use. For example, such coatings are used on die surfaces to prevent and or reduce streaking or build-up during long-term coating runs. The coatings of Milbourn et al. include polymeric compounds comprising a fluorinated oligomer portion comprising pendant fluoroaliphatic groups, pendant organic-solubilizing groups, and pendant groups that have reacted with an epoxy silane. They exhibit exceptional repellency to both aqueous and organic solvent-based liquids when newly applied to the surface of extrusion dies or other articles. With extended use, however, such fluorosilane-containing low-energy coatings tend to lose their repellency properties and their effectiveness to prevent streaking and solute build-up.

The process of applying a low-energy coating to a die can be time consuming. The coating process is typically performed in a clean room. Removing a deteriorated (i.e., spent) low-energy coating is also quite labor-intensive. It could involve chemical stripping, grit blasting, and typically requires taking the apparatus (e.g., die) out of service and shipping it to another location for the reprocessing work. It would be convenient if the spent coating could be simply rejuvenated on site at the location where the apparatus is used. Such a process could be relatively simple, and require no special equipment.

SUMMARY OF THE INVENTION

The present invention provides a process for treating a silicon-containing organic polymeric surface to provide a low-energy surface. More particularly, the present invention provides a process for restoring the repellency of (i.e., rejuvenating) a fluorosilane-containing low-energy coating without the need for removing the old coating. The process is relatively simple, fast, and typically does not require special equipment.

The present invention provides a process of treating a silicon-containing organic polymeric surface. The process comprises treating the surface with a treatment composition comprising a fluorinated silane having the following formula (Formula I):

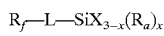

wherein: $R_f$ is a fluoroaliphatic group containing a perfluorinated terminal group; L is a covalent bond, a heteroatom, or an organic linking group; $R_a$ is an alkoxy group, an alkyl group, or an acyloxy group; X is a halide; and x is 0 to 3, with the proviso that when $R_a$ is an alkyl group, x is not 3.

The present invention also provides a process of restoring the repellency of a spent, fluorosilane-containing, low-energy coating. The process comprises treating the spent coating with a treatment composition comprising a fluorinated silane of Formula I.

Another embodiment of the invention is a process of restoring the repellency of a spent low-energy coating, wherein the low-energy coating (prior to being spent and typically even after being spent) comprises polymeric compounds which comprise a fluorochemical oligomer comprising pendant fluoroaliphatic groups, pendant organic-solubilizing groups, and pendant groups reacted with an epoxy-silane, the process comprising: applying a treatment composition to the spent low-energy coating under conditions effective to improve the repellency of the spent low-energy coating, wherein the treatment composition comprises a fluorochemical compound. Preferably, the extent of improvement is such that the coating regains substantially the level of repellency it had when it was freshly applied to a substrate.

Yet another embodiment of the present invention is a process of restoring the repellency of a spent low-energy coating, wherein the low-energy coating (prior to being spent and typically even after being spent) comprises polymeric compounds which comprise a fluorochemical oligomer comprising pendant fluoroaliphatic groups, pendant organic-solubilizing groups, and pendant groups reacted with an epoxy-silane. The process comprises: applying a treatment composition to the surface of the spent low-energy coating, wherein the treatment composition comprises a fluorochemical compound; allowing the treatment composition to dry for less than about 30 minutes; and removing excess treatment composition with an organic solvent. Preferably, the steps of applying the treatment composition, allowing it to dry, and removing excess treatment composition are repeated. Preferably, and significantly, each of these steps is carried out at room temperature.

Still another embodiment of the invention is a process for improving the repellency of an article comprising a silicon-containing organic polymeric surface. The process comprises applying a treatment composition to the silicon-containing organic polymeric surface, under conditions effective to improve the repellency of the silicon-containing organic polymeric surface. The treatment composition comprises a fluorinated silane of Formula I.

A further embodiment of the invention includes a process for making a coated article. The process comprises: providing a substrate, a liquid, and an apparatus for coating the liquid onto the substrate, the apparatus comprising a silicon-containing organic polymeric surface which contacts the liquid when the liquid is coated onto the substrate; applying to the silicon-containing organic polymeric surface of the apparatus a composition comprising a fluorinated silane of Formula I; coating the liquid onto the substrate with the apparatus; and converting the substrate into the coated article, which can be a medical imaging material, an image setting material, an industrial imaging material, or a data storage material, for example.

In addition to these processes, the present invention also provides a rejuvenated fluorosilane-containing low-energy coating comprising a polymeric compound that comprises a fluorochemical oligomer comprising pendant fluoroaliphatic groups, pendant organic-solubilizing groups, and pendant groups reacted with an epoxy-silane, wherein the fluorochemical portion of the polymer comprises an oligomeric aliphatic backbone having bonded thereto: (i) a fluoroaliphatic group having a perfluorinated terminal group through a —CH$_2$—Si—linkage; (ii) an organic-solubilizing group comprising a plurality of carbon atoms and optionally comprising one or more catenary oxygen atoms; and (iii) an organic functional group capable of reacting with an epoxy-silane, each fluoroaliphatic group, organic-solubilizing group, and group capable of reacting with an epoxy-silane being independently bonded to the oligomeric aliphatic backbone through a covalent bond, a heteroatom, or an organic linking group.

DETAILED DESCRIPTION OF PREFERRED EMBODIMENTS

The repellency of silicon-containing organic polymeric surfaces can be modified (e.g., enhanced) through the application of a fluorochemical compound using the processes of the present invention. Such surfaces occur on a wide variety of articles including portions of a coating apparatus, which contact the coating liquid, including coating dies, slide coating surfaces, edge guides, and nozzles. Such articles, particularly coating apparatuses, may be made of a silicon-containing organic polymer or have an outer coating of such a material. Furthermore, the processes of the present invention can be carried out during or after manufacture of such articles.

Such coating apparatuses are useful for coating a variety of liquids onto a variety of substrates to create a variety of articles. Such articles include imaging materials, for example, medical imaging film, graphic arts film, photosensitive printing plates, industrial imaging film, and consumer and professional photographic film. Such articles also include data storage materials, for example, the magnetic media used to make magnetic floppy diskettes or magnetic tape, and optical media used to make optical data storage cassettes and tape. The process steps for making such articles with a coating apparatus can include applying a liquid to a substrate, drying the liquid to form a coated substrate, converting the coated substrate into lengths which are packaged, or combined with the other components and then packaged.

The silicon-containing organic polymeric surface may or may not have a low surface energy prior to treatment with the fluorochemical compound using the process of the present invention. That is, it may or may not be able to repel liquids such as water and/or organic solvents prior to treatment. Typically, the silicon-containing organic polymeric surface has a relatively high surface energy prior to treatment according to the present invention, although at one time it may have had a low surface energy. This increase in the surface energy and decrease in the repellency properties of the surface is believed to be a result of abrasion of the surface molecules responsible for the low surface energy and high repellency.

For example, silicon-containing organic polymeric surfaces such as low-energy coatings that include polymeric compounds comprising a fluorinated oligomer portion comprising pendant fluoroaliphatic groups, pendant organic-solubilizing groups, and pendant groups that have reacted with an epoxy silane (as described by Milbourn et al. in U.S. patent application Ser. No. 08/659,053, filed May 31, 1996, which is incorporated herein by reference) can lose their repellency properties through extended use under abrasive conditions. The useful length of service of an article having such coatings typically depends on the amount of use and the type of liquids with which the coatings come in contact. The loss of repellency of a low-energy coating may be related, for example, to the abrasiveness of the compositions to which the coating is exposed, and to the cleaning processes used. Compositions in which all components are dissolved to form solutions appear to cause little or no deterioration of such low-energy coatings. Compositions containing particulate material (e.g., fillers, pigments, emulsions, etc.) appear to cause more rapid deterioration of the repellency of such low-energy coatings.

It has been discovered that this loss of repellency results from a depletion of the fluorine content at the surface of the coating, which can occur as a result of abrasion. For example, a fluorosilane-containing coating can go from a fluorine content of about 20 atomic percent to about 5 atomic percent, and even less, at the surface during extended use, as determined by fluorine elemental analysis data using ESCA (Electron Scanning Chemical Analysis). A new (i.e., virgin or fresh) low-energy coating comprising a polymeric compound having a fluorinated oligomer portion comprising pendant fluoroaliphatic groups, pendant organic-solubilizing groups, and pendant groups that have reacted with an epoxy silane (as described by Milbourn et al. in U.S. patent application Ser. No. 08/659,053, filed May 31, 1996) typically has a relatively fluorine-rich surface (e.g., fluorine concentration=19.0 atomic percent). After this same coating demonstrates a loss of repellency, the surface can exhibit a relatively fluorine-poor surface (fluorine concentration=3.9 atomic percent). Such a fluorine-poor surface is referred to herein as a "spent low-energy coating" or a "spent, fluorosilane-containing, low-energy coating." Such a coating includes a polymeric material that contains silicon atoms and a fluorine-poor surface (i.e., a surface with a substantially lower concentration of fluorine atoms), although initially (i.e., upon initial application) the coating included a fluorine-rich surface. The fluorine atoms may have been removed by abrasion such that they are in very low concentration, or are not present at all. Thus, a low-energy coating of the type described in Milbourn et al. upon being spent may or may not have any pendant fluoroaliphatic groups.

It will be understood by one of skill in the art that the process of the present invention can be used to coat a variety of silicon-containing organic polymeric surfaces, although preferred such surfaces are the low-energy coatings described by Milbourn et al. in U.S. patent application Ser. No. 08/659,053 (filed May 31, 1996) that have reduced repellency compared to when the coating was newly applied to a substrate surface, which are referred to herein as "spent" coatings. As used herein, a "spent low-energy coating" is one that has a reduction in repellency compared to when it was freshly applied to a substrate surface. This does not mean that there has to be complete loss of repellency, however. For example, if an article, such as an extrusion die, experiences only a partial loss in repellency, as determined qualitatively or by contact angle measurements, there may be a desire to rejuvenate the surface. Preferably, a "spent low-energy coating" is one that has a 2-butanone contact angle that is at least about 30% lower than that of a freshly prepared coating, which typically has a 2-butanone contact angle of about 32° to about 33°.

The present invention provides a process for treating a spent fluorosilane-containing low-energy coating to improve, and preferably, substantially restore, the repellency properties of the coating after the repellency of the original coating begins to fail, or completely fails. The process essentially "rejuvenates" such coatings, preferably restoring their repellency properties to essentially what they were when the coatings were new, although such a significant improvement is not required. That is, the process of the present invention includes within its scope treatments that produce any improvement in the repellency properties of the coating, determined either qualitatively or by measuring contact angles. This rejuvenating treatment process may be used repeatedly as needed. Significantly, the process of the present invention does not require removing the original coating. Thus, it can prolong the life of the original coating.

The process of the present invention can also be used for treating a silicon-containing organic polymeric surface that may not have ever had repellency properties. Thus, the surface can be modified to provide (rather than restore) a low surface energy and repellency properties. Again, the process of the present invention includes within its scope treatments that produce any improvement in the repellency properties of the coating, determined either qualitatively or by measuring contact angles. As the repellency properties of this new low-energy surface deteriorates, it can also be rejuvenated using the process of the present invention as described herein.

The process of the present invention involves the application of a treatment composition comprising one or more fluorochemical compounds to a silicon-containing organic polymeric surface, preferably, to a spent, fluorosilane-containing, low-energy coating. Significantly, application of the fluorochemical compound(s) can provide a surface that effectively repels water, and preferably, repels water and a wide variety of organic solvents.

The fluorochemical compounds used in the process of the present invention are preferably those that will bond (e.g., as by a covalent linkage) to the silicon-containing organic polymeric surface (e.g., the spent low-energy coating surface) so that, once applied, they will not be readily dissolved, or extracted away during normal use. It will be appreciated, however, that extended periods of exposure to water or certain organic solvents may result in the reduction of repellency properties with respect to organic solvents, thereby requiring rejuvenation. Thus, preferred fluorochemical compounds are those that can chemically react with a silicon-containing organic polymeric surface, preferably, a spent fluorosilane-containing low-energy coating, and graft onto the polymeric surface. Fluorochemical compounds that react or polymerize in some way to form insoluble products may also be employed, even though they do not chemically "graft" onto the existing polymeric surface, as long as they will not be readily dissolved or extracted away once applied.

Preferred fluorochemical compounds for use in the process of the present invention include one or more chemical groups such as isocyanates, silanes (e.g., alkoxysilanes or siloxanes, acyloxysilanes, halosilanes, and mixtures thereof), epoxides, polyalkoxy-alkylmelamines, anhydrides, carbodiimides, aziridines, chloroformates, and activated halides, that are reactive with sites on the polymer of the silicon-containing organic polymeric surface. For best results, the fluorochemical compounds react with sites on the surface of the polymer to form a covalent chemical bond with no by-products (such as hydrophilic salts or leachable compounds) that could interfere with the final repellency properties of the restored coating.

More preferably, the fluorochemical compounds include one or more silane groups that are reactive with sites on the polymer of a silicon-containing organic polymeric surface. Of these, the fluorochemical compound is preferably a fluorinated silane that includes an organic moiety which may contain heteroatoms or functional groups. Most preferably, the fluorinated silane is of the following Formula (I):

$$R_f—L—SiX_{3-x}(R_a)_x \qquad (I)$$

wherein: $R_f$ is a fluoroaliphatic group containing a perfluorinated terminal group; L is a covalent bond, a heteroatom, or an organic linking group; $R_a$ is an alkoxy group (preferably, a lower alkoxy group such as an alkoxy group having from 1 to 4 carbon atoms, and more preferably, a methoxy group), an alkyl group (preferably, a lower alkyl group having from 1 to 4 carbon atoms, and more preferably, a methyl group), or an acyloxy group (preferably, a —O—C(O)—Alk wherein "Alk" is an alkyl group having from 1 to 4 carbon atoms); X is a halide (preferably, Cl, Br, and I); and x is 0 to 3, with the proviso that when $R_a$ is an alkyl group, x is not 3. Of these, $R_a$ is preferably a lower alkoxy group, more preferably, a methoxy group, and x is 3.

$R_f$ is a stable, inert, nonpolar, preferably saturated monovalent group which is both oleophobic and hydrophobic. $R_f$ preferably contains at least about 3 carbon atoms, more preferably, about 3 to about 20 carbon atoms, even more preferably, about 4 to about 20 carbon atoms, and most preferably, about 6 to about 12 carbon atoms. $R_f$ can contain straight chain, branched chain, or cyclic fluorinated alkyl groups or combinations thereof, or combinations thereof with straight chain, branched chain, or cyclic alkyl groups. $R_f$ is preferably free of polymerizable olefinic unsaturation and can optionally contain catenary heteroatoms such as oxygen, divalent or hexavalent sulfur, or nitrogen. It is preferred that each $R_f$ contain about 40% to about 78% fluorine by weight, and more preferably about 50% to about 78% fluorine by weight. The terminal portion of the $R_f$ group contains a perfluorinated terminal group. This terminal group preferably contains at least about 7 fluorine atoms, e.g., $CF_3CF_2CF_2$—, $(CF_3)_2CF$—, or the like. Perfluoroaliphatic groups, i.e., those of the formula $C_nF_{2n+1}$— wherein n is about 6 to about 12, are the most preferred embodiments of $R_f$.

Group L in Formula (I) can be a covalent bond, a heteroatom (e.g., O or S), or an organic linking group. Group L is preferably an organic linking group containing about 1 to about 20 carbon atoms, and may optionally contain groups such as straight chain, branched chain, or cyclic alkylene, arylene, or aralkylene groups, oxy, thio, sulfonyl, sulfinyl, imino, sulfonamido, urethanylene, ureylene, and combinations thereof such as sulfonamidoalkylene. Linking groups can be selected according to ease of preparation and commercial availability. Preferred linking groups L are those wherein an alkylene group (contained within linking group L) provides attachment of the $R_f$ group to the —$SiX_{3-x}(R_a)_x$ portion of the fluorinated silane.

Below is a partial representative list of suitable organic L groups. For the purposes of this list, each g is an integer from 0 to about 10, each k is an integer from about 1 to about 20, each p is an integer from about 2 to about 10, and each R' is hydrogen, phenyl, or alkyl of about 1 to about 4 carbon atoms.

—$SO_2N(R')(CH_2)_k$—
—$CON(R')(CH_2)_k$—
—$(CH_2)_k$—
—$(CH_2)_kO(CH_2CH_2O)_2(CH_2)_p$—
—$(CH_2)_2SO_2N(R')(CH_2)_k$—
—$(CH_2)_2S(CH_2)_k$—
—$(CH_2)_2OCH_2CH(OH)CH_2NHCH_2CH_2CH_2$—
—$SO_2N(R')(CH_2)_kS(CH_2)_p$—
—$(CH_2)_2S(CH_2)_kC(O)NH(CH_2)_p$—
—$SO_2N(R')(CH_2)_kOCH_2CH(OH)CH_2CH_2CH(OH)CH_2O(CH_2)_p$—

—$(CH_2)_2S(CH_2)_2C(O)O(CH_2)_p$—
—$NHC(O)N(R')(CH_2)_p$—
—$NHC(O)O(CH_2)_p$—
—$SO_2N(R')(CH_2)_kOC(O)NH(CH_2)_p$—
—$SO_2N(R')(CH_2)_kNH(CH_2)_p$—
—$N(R')(CH_2)_kOC(O)(CH_2)_p$—
—$CH_2O(CH_2)_p$—
—$(CH_2)_2SC(O)(CH_2)_p$—
—$SO_2N(R')(CH_2)_kO(CH_2CH(CH_2Cl)O)_gC(O)(CH_2)_p$—
—$SO_2N(R')(CH_2)_kO(CH_2CH(CH_3)O)_gC(O)(CH_2)_p$—
—$SO_2N(R')(CH_2)_kO(CH_2CH_2O)_gC(O)(CH_2)_p$—
—$SO_2N(R')(CH_2)_kO(CH_2CH(CH_2Cl)O)_g(CH_2)_p$—
—$SO_2N(R')(CH_2)_kO(CH_2CH(CH_3)O)_g(CH_2)_p$—
—$SO_2N(R')(CH_2)_kO(CH_2CH_2O)_g(CH_2)_p$—

L is preferably alkylene or sulfonamidoalkylene (—$SO_2N(R')(CH_2)_k$—).

Examples of representative fluorinated silanes (including siloxanes, acyloxysilanes, and halosilanes) include, but are not limited to, the following:

$C_6F_{13}CH_2CH_2S(CH_2)_6SiCl_3$
$C_6F_{13}CH_2CH_2Si(CH_3)Cl_2$
$C_6F_{13}SO_2N(C_4H_9)CH_2CH_2OCH_2CH_2CH_2Si(CH_3)Cl_2$
$C_6F_{13}CH_2CH_2Si(OC_2H_5)_3$
$C_6F_{13}SO_2N(CH_3)CH_2CH_2OC(O)CH_2CH_2CH_2Si(OCH_3)_3$
$C_7F_{15}C(O)N(C_2H_5)CH_2CH_2CH_2Si(OCH_3)_3$
$C_7F_{15}CH_2OCH_2CH_2CH_2SiCl_3$
$C_7F_{15}CH_2OCH_2CH_2CH_2SiCl(OCH_3)_2$
$C_7F_{15}CH_2OCH_2CH_2CH_2Si(OC(O)CH_3)_3$
$C_8F_{17}SO_2N(C_2H_5)CH_2CH_2CH_2Si(OCH_3)_3$
$C_8F_{17}SO_2N(C_2H_5)CH_2CH_2CH_2SCH_2CH_2CH_2Si(OCH_3)_3$
$C_8F_{17}SO_2N(C_2H_5)CH_2CH_2OCH_2CH_2Si(CH_3)(OC_2H_5)_2$
$C_8F_{17}SO_2NH(CH_2)_{11}Si(OCH_3)_3$
$C_8F_{17}SO_2N(CH_3)CH_2CH_2OC(O)NH(CH_2)_3Si(OC_2H_5)_3$
$C_8F_{17}SO_2N(C_2H_5)CH_2CH_2CH_2Si(OC(O)CH_3)_3$
$C_8F_{17}SO_2NHCH_2CH_2NHCH_2CH_2CH_2Si(OCH_3)_3$
$C_8F_{17}SO_2N(C_2H_5)CH_2CH_2CH_2SiCl_3$
$C_8F_{17}SO_2N(CH_3)CH_2CH_2CH_2Si(CH_3)Cl_2$
$C_8F_{17}SO_2N(CH_3)CH_2CH_2CH_2Si(OCH_3)_3$
$C_8F_{17}SO_2N(C_2H_5)CH_2CH_2O(C_3H_6O)_2CH_2CH_2CH_2Si(OCH_3)_3$
$C_8F_{17}SO_2N(CH_3)CH_2C_6H_4CH_2CH_2CH_2Si(OCH_3)_3$
$C_8F_{17}CH_2CH_2OCH_2CH_2CH_2Si(OC_2H_5)_3$
$C_8F_{17}C(O)NH(CH_2)_8Si(OCH_3)_3$
$C_8F_{17}CH_2CH_2SCH_2CH_2CH_2Si(OC_2H_5)_3$
$C_8F_{17}CH_2CH_2SCH_2CH_2C(O)NHCH_2CH_2CH_2SiCl_3$
$C_8F_{17}CH_2CH_2OCH_2CH(OH)CH_2NHCH_2CH_2CH_2Si(OCH_3)_3$
$C_8F_{17}CH_2CH_2SCH_2C(CH_3)C(O)O(CH_2)_3Si(OCH_3)_3$
$C_8F_{17}CH_2CH_2SCH_2CH_2C(O)O(CH_2)_3Si(OCH_3)_3$
$C_8F_{17}CH_2CH_2NHCH_2CH_2CH_2Si(OCH_3)_3$
$C_8F_{17}CH_2CH_2NHCH_2CH_2CH_2Si(OCH_3)_3$
$C_8F_{17}CH_2CH_2NHCH_2CH_2CH_2Si(CH_3)Cl_2$
$C_8F_{17}NHC(O)O(CH_2)_3Si(OCH_3)_3$
$C_8F_{17}SO_2N(CH_3)CH_2CH_2O(CH_2CH(OH)CH_2)_2O(CH_2)_3Si(OCH_3)_3$
$(CF_3)_2CFOC_2F_4C(O)NHCH_2CH_2CH_2Si(OC_2H_5)_3$
$(CF_3)_2CF(CF_2)_8C_2H_2SC(O)CH_2CH_2CH_2Si(OCH_3)_3$
$(C_3F_7)_2C_6H_3SO_2N(CH_3)C_2H_4OC(O)CH_2CH_2CH_2Si(OCH_3)_3$
$C_{10}F_{21}CH_2CH_2CH_2Si(CH_3)_2(OC_2H_5)$
$C_{10}F_{21}SO_2N(C_2H_5)(CH_2CH_2O)_{10}(CH_2)_3Si(OCH_3)_3$ and combinations thereof, and similar compounds capable of reacting with silicon-containing organic polymeric surfaces (e.g., spent fluorosilane-containing low-energy coatings), and providing a fluorine-rich surface.

Preferred fluorinated silanes are perfluoroaliphaticsulfonylamido silanes (including siloxanes, acyloxysilanes, and halosilanes) and combinations thereof. Representative examples of such compounds include:

$C_8F_{17}SO_2N(C_2H_5)CH_2CH_2CH_2Si(OCH_3)_3$
$C_8F_{17}SO_2N(C_2H_5)CH_2CH_2CH_2Si(OC(O)CH_3)_3$
$C_8F_{17}SO_2N(C_2H_5)CH_2CH_2CH_2SiCl_3$
$C_8F_{17}SO_2N(CH_3)CH_2CH_2CH_2Si(CH_3)Cl_2$
$C_8F_{17}SO_2N(CH_3)CH_2CH_2CH_2Si(OCH_3)_3$

Another preferred compound is $C_8F_{17}CH_2CH_2NHCH_2CH_2CH_2Si(OCH_3)_3$. A particularly preferred compound is $C_8F_{17}SO_2N(C_2H_5)CH_2CH_2CH_2Si(OCH_3)_3$ (N-ethyl-N-propyltrimethoxysilylperfluorooctylsulfonamide), which can be prepared as described in Example 6 of U.S. Pat. No. 5,274,159 (Pellerite et al.). This compound is also commercially available from the 3M Company, St. Paul, Minn. as Product No. FC-405 (2 wt-% alcoholic solution) or FC-405-60 (60 wt-% alcoholic solution).

Such compounds, as well as other suitable fluorochemical compounds, are preferably liquids, which can be applied in the form of a thin film, neat or from solution, for example. Preferably, they undergo reaction with sites on the silicon-containing organic polymeric surface (preferably, a spent, fluorosilane-containing, low-energy coating) to form covalent bonds. Typically, the silicon-containing organic polymeric surface includes groups such as hydroxyl, carboxyl, and/or silanol groups to which the reactive groups of the fluorochemical (preferably, fluorinated silane) can graft. Preferably, sites on the silicon-containing organic polymeric surface include silanol (—Si—OH) groups.

The bonding of the preferred fluorochemical compounds of Formula (I) to a silicon-containing organic polymeric surface (preferably, a spent, fluorosilane-containing, low-energy coating) is greatly enhanced by the presence of —SiO— groups at the polymer surface. This allows for the formation of covalent linkages between the fluorochemical compound and sites on the polymer by forming strong Si—O bonds. For example, with the preferred compound $C_8F_{17}SO_2N(C_2H_5)CH_2CH_2CH_2Si(OCH_3)_3$, the reaction is a condensation type reaction with sites on the polymeric surface resulting in a small amount of methyl alcohol produced as a by-product. Typically, the film applied is so thin that the small amount of alcohol formed easily dissipates into the air and does not interfere with the surface properties of the new repellent surface (e.g., the newly "rejuvenated" surface). After effective application of the treatment composition, solvents that previously could dissolve the fluorochemical compound, no longer do so, but rather, are now repelled by the new low-energy surface.

Preferred fluorosilane-containing low-energy coatings, which become spent during use and for which the process of the present invention is particularly advantageous, include polymeric compounds that include a fluorochemical oligomer comprising pendant fluoroaliphatic groups, pendant organic-solubilizing groups, and pendant groups reacted with an epoxy-silane. Preferably, the fluorochemical portion of the polymer comprises an oligomeric aliphatic backbone having bonded thereto: (i) a fluoroaliphatic group having a perfluorinated terminal group; (ii) an organic-solubilizing group comprising a plurality of carbon atoms and optionally comprising one or more catenary oxygen atoms; and (iii) an organic functional group capable of reacting with an epoxy-silane, each fluoroaliphatic group, organic-solubilizing group, and group capable of reacting with an epoxy-silane being independently bonded to the oligomeric aliphatic backbone through a covalent bond, a heteroatom, or an organic linking group. Preferably, the epoxy-silane comprises terminal epoxy groups and terminal, polymerizable silane groups.

More preferably, the fluorochemical portion of the fluorosilane-containing, low-energy coating, which becomes spent during use, comprises one or more oligomers represented by the following Formula II:

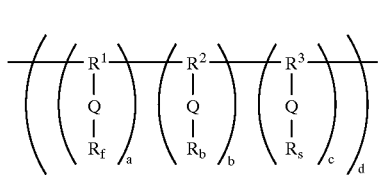
(II)

wherein: $R^1$, $R^2$, and $R^3$ respectively represent polymerized units derived from fluorinated, bifunctional, and solubilizing monomers and together form an aliphatic backbone; each Q independently is a covalent bond, a heteroatom, or an organic linking group as described below; $R_f$ is a fluoroaliphatic group containing a perfluorinated terminal group as described above; $R_b$ is an organic functional group capable of reacting with an epoxy silane; $R_s$ is an organic-solubilizing group comprising a plurality of carbon atoms and optionally comprising one or more catenary oxygen atoms; a, b, c, and d, are integers such that the compound is oligomeric; and the epoxy-silane is represented by

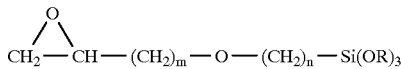

and

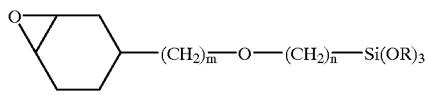

where m and n are integers from 1 to 4; and R is an aliphatic group of less than 10 carbon atoms; an acyl group of less than 10 carbon atoms; or a group of the formula $(CH_2CH_2O)_jZ$ in which j is an integer of at least 1; and Z is an aliphatic group of less than 10 carbon atoms.

In the fluorinated oligomer, the fluorinated, solubilizing, and group capable of reacting with an epoxy-silane are linked to the aliphatic backbone by a linking group designated Q in Formula II. Linking group Q can be a covalent bond, a heteroatom (e.g., O or S), or an organic group. The linking group Q is preferably an organic group containing about 1 to about 20 carbon atoms, and optionally containing oxygen-, nitrogen-, or sulfur- containing groups or a combination thereof, and preferably free of functional groups, e.g., polymerizable olefinic double bonds, thiols, easily abstracted hydrogen atoms such as cumyl hydrogens, and other such functionalies known to those skilled in the art that substantially interfere with free-radical oligomerization. Examples of structures suitable for linking group Q include straight chain, branched chain, or cyclic alkylene, arylene, aralkylene, oxy, oxo, thio, sulfonyl, sulfinyl, imino, sulfonamido, carboxamido, oxycarbonyl, urethanylene, ureylene, and combinations thereof such as sulfonamidoalkylene. Preferred linking groups Q can be selected according to ease of preparation and commercial availability and will differ depending on whether it links $R_f$, $R_s$, or $R_b$ to the aliphatic backbone.

Below is a partial representative list of suitable organic Q groups. For the purposes of this list, each k is independently an integer from about 1 to about 20, g is an integer from 0 to about 10, h is an integer from about 1 to about 20, R' is hydrogen, phenyl, or alkyl of 1 to 4 carbon atoms, and R" is alkyl of about 1 to 20 carbon atoms.

—$SO_2NR'(CH_2)_kO(O)C$—
—$CONR'(CH_2)_kO(O)C$—
—$(CH_2)_kO(O)C$—$CH_2CH(OH)CH_2O(O)C$—$CH_2CH(OR")CH_2O(O)C$—$(CH_2)_kC(O)O$—$(CH_2)_kSC(O)$—
—$(CH_2)_kO(CH_2)_kO(O)C$—
—$(CH_2)_kS(CH_2)_kO(O)C$—
—$(CH_2)_k(OCH_2CH_2)_kO(O)C$—
—$(CH_2)_kSO_2(CH_2)_kO(O)C$—
—$SO_2NR'(CH_2)_kO(CH_2CH_2)_kO(O)C$—
—$(CH_2)_kSO_2N\ R'(CH_2)_kO(O)C$—
—$(CH_2)_kSO_2$—
—$SO_2NR'(CH_2)_k$—
—$OC_6H_4CH_2O(O)C$—
—$(CH_2)_hO((O)C(CH_2)_6O)_gC(O)(CH_2)_6OC(O)$—
—$(CH_2)_hO((O)C(CH_2)_6NH)_gC(O)(CH_2)_6NHC(O)$—
—$C(O)O(CH_2)_2OC(O)NH(CH_2)_2OC(O)$—
—$(CH_2)_hO(CH_2CH$—$O)_gCH_2CH_2$—$OC(O)$—

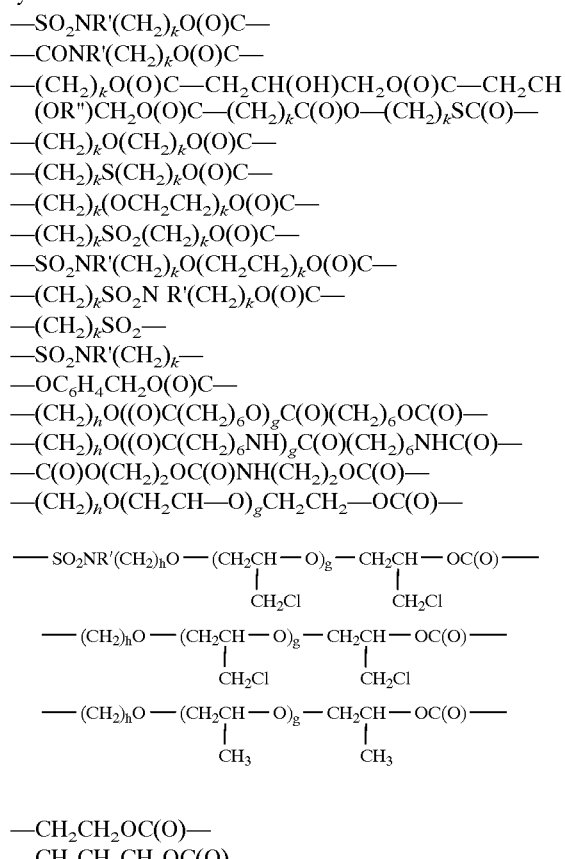

—$CH_2CH_2OC(O)$—
—$CH_2CH_2CH_2OC(O)$—

For linking $R_f$, Q is preferably alkylene or sulfonamido, or sulfonamidoalkylene. For linking $R_s$, Q is preferably oxycarbonyl. For linking $R_b$, Q is preferably alkyleneoxycarbonyl.

Most preferably, the fluorochemical portion of the of the fluorosilane-containing low-energy coating, which becomes spent during use, comprises one or more oligomers represented by the following Formula (III):

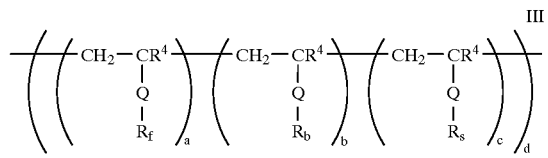
III wherein $R^4$ is hydrogen, halogen, or methyl; and Q, $R_f$, $R_s$, $R_b$, a, b, c, and d are as defined above.

Formulas used herein to represent the structures of the oligomers of the invention indicate the presence of chains of randomly polymerized units derived from several types of monomers. The monomers include: oligomerizing fluorinated monomers having a fluoroaliphatic group $R_f$ as described above and ethylenic unsaturation, such as N-ethyl-perfluoro(octane)sulfonamidoethyl methacrylate (EtFOSEMA); bifinctional monomers having groups capable of reacting with an epoxy-silane such as hydroxyethylmethacrylate, hydroxyethylacrylate, hydroxypropylmethacrylate, and hydroxypropylacrylate; and solubilizing monomers such as alkyl (meth)acrylates, (meth)acrylates of polyalkylene glycols, (meth)acrylates of methoxypolyethylene glycols and polyethylene glycols. Such monomers are described by Milbourn et al. in U.S. patent application Ser. No. 08/659,053, filed May 31, 1996.

The formulas are not intended to indicate ordering of units, e.g., "blocks" of units such as in a block copolymer, or alternating units in the chain. The terms "oligomer" or "oligomeric" when used herein designate compounds containing a plurality of polymerized units, but fewer than that number of polymerized units present in a polymer, e.g., chains of 5 to about 100 polymerized units.

As a means of simplifying the discussion and recitation of certain substituent groups, the terms "group" and "moiety" are used to differentiate between those chemical species that may be substituted and those which are not so substituted. Thus, when the term "group," or "aryl group," is used to describe a substituent, that substituent includes the use of additional substituents beyond the literal definition of the basic group. Where the term "moiety" is used to describe a substituent, only the unsubstituted group is intended to be included. For example, the phrase, "alkyl group" is intended to include not only pure hydrocarbon alkyl chains, such as methyl, ethyl, propyl, t-butyl, cyclohexyl, iso-octyl, octadecyl and the like, but also alkyl chains bearing substituents known in the art, such as hydroxyl, alkoxy, phenyl, halogen atoms (F, Cl, Br, and I), cyano, nitro, amino, carboxy, etc. For example, alkyl group includes ether groups (e.g., $CH_3$—$CH_2$—$CH_2$—O—$CH_2$—), haloalkyls, nitroalkyls, carboxyalkyls, hydroxyalkyls, sulfoalkyls, etc. On the other hand, the phrase "alkyl moiety" is limited to the inclusion of only pure hydrocarbon alkyl chains, such as methyl, ethyl, propyl, t-butyl, cyclohexyl, iso-octyl, octadecyl, and the like. Substituents that react with active ingredients, such as very strongly electrophilic or oxidizing substituents, would of course be excluded by the ordinarily skilled artisan as not being inert or harmless.

The fluorochemical compounds useful in the process of the present invention can be applied neat or in a solvent system. That is, the treatment compositions of the present invention can include one or more fluorochemical compounds, optional solvents, and other optional additives. The solvent(s) are substantially inert (i.e., substantially nonreactive with the fluorochemical compound) and preferably capable of dissolving the fluorochemical compound to form a stable solution. Preferably, the solvent(s) are also capable of evaporating under ambient conditions. Examples of appropriate solvents include, but are not limited to, hydrocarbons, fluorinated hydrocarbons, hydrofluoroethers, chlorinated hydrocarbons, chlorofluorocarbons, perfluorocarbons, alcohols, ethers, ketones, esters, and mixtures thereof. The solvent system can also include small amounts of water to initiate hydrolysis and reaction with the surface of the spent, fluorosilane-containing, low-energy coating.

The treatment composition can include very small amounts of the fluorochemical compound(s), i.e., about 0.1 weight percent (wt-%), up to about 100 wt-% (i.e., neat), of the fluorochemical compound(s). Preferably, the fluorochemical compound(s) is present in the treatment composition in an amount of at least about 1.0 wt-%, and no greater than about 50 wt-%, based on the total weight of the treatment composition.

The treatment composition containing the fluorochemical compound can also include additives, such as catalysts, odor masking agents, surfactants, dyes, perfumes, UV blockers, pigments, co-monomers, photoinitiators, matting agents, resins, silicones, waxes, fillers, viscosity modifiers, water scavengers, photoacids, levelers, coalescents, IR absorbers, magnetic material, and metals, provided they do not interfere with the action of the fluorochemical compound and the repellency of the final coating.

Catalysts are particularly preferred. Significantly, certain catalysts accelerate cure of the treatment composition at room temperature (i.e., about 20° C. to about 25° C.). As used herein, to "cure" refers to the formation of a strong attachment of the fluorochemical compound to the surface being treated such that it is not readily dissolved or extracted away once applied. Typically, and preferably, the curing process involves covalent bond formation of the fluorochemical compound with sites on the silicon-containing organic polymeric surface.

Particularly preferred catalysts accelerate cure of the treatment composition at room temperature in a short period of time. This feature allows use of this invention in a convenient manner, and greatly improves its practicality. Examples of suitable catalysts are acid catalysts, including both organic acids and mineral acids (i.e., inorganic acids). Preferred acid catalysts include, but are not limited to, trifluoromethylsulfonic acid, hydrochloric acid, lactic acid, sulfuric acid, phosphoric acid, acetic acid, and formic acid. Mixtures of such acid catalysts can also be used. A particularly preferred acid catalyst is phosphoric acid.

Acid catalysts are particularly preferred because in certain preferred situations they can accelerate cure of the treatment composition at room temperature such that it occurs in less than about 10 minutes. Preferably, curing is accelerated to such an extent that this time also typically includes the time necessary for a solvent to evaporate if one is present. Although a catalyst is not required, if one is used, it is preferably used in an amount of at least about 0.01 wt-%, and more preferably, in an amount of at least about 0.05 wt-%, based on the total weight of the treatment composition. Typically, no more than about 1.0 wt-% of a catalyst is included within the treatment composition.

Preferably, the silicon-containing organic polymeric surface (e.g., spent, fluorosilane-containing, low-energy coating) should be extremely clean prior to applying the fluorochemical compound for optimum repellency characteristics and durability. That is, the silicon-containing organic polymeric surface of the substrate to be coated should be substantially free of organic contamination prior to treatment (e.g., coating). Preferred processes of removing such contamination prior to treating the surface include gentle scouring and/or solvent washing with 2-butanone or ethyl acetate, for example.

Significantly, the silicon-containing organic polymeric surface (e.g., spent, fluorosilane-containing, low-energy coating) is typically contacted with the treatment composition (preferably, a treatment solution) at room temperature (i.e., about 20° C. to about 25° C.) for a relatively short period of time. Typically, the contact time (i.e., the total time the spent low-energy coating is in contact with the treatment composition) is less than about 30 minutes. Preferably, the contact time is less than about 20 minutes, more preferably, less than about 10 minutes, and most preferably, less than about 5 minutes. During this contact time the solvent system is typically allowed to at least partially evaporate, and typically to substantially completely evaporate. Thus, this contact time is also referred to as a drying time.

Upon evaporation of the solvent, excess fluorochemical compound can form an oily residue. This oily residue can be removed, thereby removing excess treatment composition, simply by wiping with a tissue or using an organic solvent, such as 2-butanone.

Although curing may require several hours for certain systems, preferably, and significantly, the treatment composition is capable of curing to form a low-energy surface (e.g., a rejuvenated coating) under ambient conditions (i.e., at room temperature) within a short period of time (preferably, less than about 30 minutes, more preferably, less than about 20 minutes, and most preferably, less than about 10 minutes). Without an acid catalyst, the cure time is typically at least about 14 hours at room temperature; however, with an acid catalyst, the cure time is typically no greater than about 10 minutes, and preferably, no greater than about 5 minutes, at room temperature. This time typically includes the time necessary for the solvent to evaporate (i.e., the drying step).

If desired, the treatment composition can be exposed to a subsequent thermal curing step. This subsequent thermal curing step typically involves exposing the article or substrate to a temperature greater than about 25° C. (preferably, at a temperature of at least about 50° C., and more preferably, at least about 100° C.) for a time sufficient to cure the coating.

A particularly preferred treatment composition, preparation method, and method of coating are as follows. Prepare a 0.1 wt-% solution of phosphoric acid in ethyl acetate (Solution A) by mixing 0.1 gram (g) of reagent grade phosphoric acid with 100 g of reagent grade ethyl acetate in a flask. Also prepare a 16.7 wt-% solution of a fluorinated silane (Solution B) by mixing 0.4 g of $C_8F_{17}SO_2N(C_2H_5)CH_2CH_2CH_2Si(OCH_3)_3$ with 2 g of reagent grade ethyl acetate. Immediately before applying the treatment composition to a clean surface, mix equal weights of the two solutions, typically by adding Solution A to Solution B. Apply the treatment composition, preferably at room temperature, to the surface of the article or substrate to be treated. This can be done by a variety of methods, such as by brushing or wiping it on. Allow the treatment composition to at least partially dry for a short period of time, preferably for less than about 30 minutes as discussed above, and often for only about 1 minute. Gently wipe the surface with a dry cloth, such as a cotton pad, and then wipe off excess treatment composition using a cloth, such as a cotton pad, impregnated with an organic solvent, such as 2-butanone. When the organic solvent has evaporated from the surface, repeat these steps by applying the treatment composition, allowing it to dry for a short period of time, wiping it with a dry cloth, removing excess treatment composition with an organic solvent, and allowing the organic solvent to evaporate.

Advantageously, the treatment composition can be applied to a spent low-energy coating on an article such as a coating apparatus without dissasembly. For example, the fluorosilane and catalyst can be incorporated into a cleaning solvent used to clean the coating slots during pauses in coating and between coating runs. As this solvent flows over the die lips, it will react with sites on the spent low energy coating. After wiping, the original low-energy coating will be rejuvenated. Alternatively, the fluorosilane and catalyst can be incorporated into cleaning solvents used to spray the die lip during cleaning. Again, after wiping, the original low-energy coating will be rejuvenated.

The process of the present invention is capable of providing a highly repellent surface when the treatment composition is applied appropriately to a silicon-containing organic polymeric surface. Preferably, the process of the present invention is capable of restoring a spent, fluorosilane-containing, low-energy coating to substantially the same repellency characteristics as when it was new. That is, a rejuvenating treatment, which is prepared by the process of the present invention, when applied to the surface of a die, reduces the amount of streaking and reduces the amount of material (e.g., solute) build-up during use when compared to the untreated spent, low-energy coating.

Repellency can be determined qualitatively by challenging the surface of a treated article with water or an organic solvent such as ethyl acetate, 2-butanone (i.e., methyl ethyl ketone or "MEK"), or acetone, for example. An effective coating is one that will repel the liquid such that the it forms droplets (i.e., beads) that can be easily removed from the surface (e.g., by running off when the surface is tilted). An ineffective coating is one on which the liquid forms a sheet on the surface of the coating or droplets with a low angle of contact, thereby effectively wetting the surface. In such a situation, droplets may be formed, but some of the liquid remains on the surface when it is tilted.

Preferably, the process of the present invention is capable of providing a sufficiently low surface energy, such that the surface is capable of repelling water, and more preferably, capable of repelling water and organic solvents. Most preferably, the process of the present invention is capable of restoring a spent, fluorosilane-containing, low-energy coating to substantially the same surface energy as when it was new.

For effective repellency, the surface energy of a "low-energy" coated material should be less than the surface tension of the liquid desired to be repelled. The greater the difference between the surface tension of the low-energy surface and the liquid, the greater the repellency. Preferably, the rejuvenated coating has a surface energy of less than about 70 mN/m, more preferably, less than about 50 mN/m, and most preferably, less than about 20 mN/m, which is similar to that of a new fluorosilane-containing, low-energy coating.

Preferably, the process of the present invention is also capable of restoring a spent, fluorosilane-containing, low-energy coating to substantially the same water (or, more preferably, 2-butanone) contact angle as when it was new. For example, the water contact angle of a new coating according to U.S. patent application Ser. No. 08/659,053 (filed May 31, 1996) is typically at least about 90°, with a spent coating having a water contact angle of less than about 40°. A rejuvenated coating typically has a water contact angle of at least about 90°. The 2-butanone contact angle of a new coating according to U.S. patent application Ser. No. 08/659,053 (filed May 31, 1996) is typically about 300 to about 35°, with a spent coating having a 2-butanone contact angle of about 0°. A rejuvenated coating typically has a 2-butanone contact angle of about 300 to about 35°.

In preferred embodiments, upon effectively rejuvenating a spent, fluorosilane-containing, low-energy coating, the surface includes perfluorinated groups attached to the surface through a —$CH_2$—Si— linkage. Preferably, the rejuvenated fluorosilane-containing low-energy coatings include polymeric compounds that include a fluorochemical oligomer comprising pendant fluoroaliphatic groups, pendant organic-solubilizing groups, and pendant groups reacted with an epoxy-silane, wherein the fluorochemical portion of the polymer comprises an oligomeric aliphatic backbone having bonded thereto: (i) a fluoroaliphatic group having a perfluorinated terminal group through a —$CH_2$—Si— linkage; (ii) an organic-solubilizing group comprising a plurality of carbon atoms and optionally comprising one or more catenary oxygen atoms; and (iii) an organic functional group capable of reacting with an epoxy-silane, each fluoroaliphatic group, organic-solubilizing group, and group capable of reacting with an epoxy-silane being independently bonded to the oligomeric aliphatic backbone through a covalent bond, a heteroatom, or an organic linking group. Thus, the rejuvenated, fluorosilane-containing, low-energy coatings of the present invention are substantially the same as the fluorosilane-containing, low-energy coatings described above except they include perfluorinated groups attached to the surface through a —$CH_2$—Si— linkage, which are present in addition to or in place of the fluoroaliphatic groups of the low-energy coating prior to being spent.

Advantages of the invention are illustrated by the following examples. However, the particular materials and amounts thereof recited in these examples, as well as other conditions and details, are to be interpreted to apply broadly in the art and should not be construed to unduly limit the invention.

EXPERIMENTAL EXAMPLES

All materials used in the following examples are readily available from standard commercial sources, such as Aldrich Chemical Co. (Milwaukee, Wis.). All percentages are by weight unless otherwise indicated. The following additional terms and materials were used.

EtFOSEMA is N-ethyl-perfluoro(octane)sulfonamidoethyl methacrylate, and is available from 3M Company, St. Paul, Minn. as Product No. FX-14.

γ-Glycidoxypropyl trimethoxysilane is available under the name Z-6040 from Dow Chemical Company, Midland, Mich. It is also available under the name A-1 87 from OSi Specialties Inc., Danbury, Conn.

Triphenylsulfonium hexafluoroantimonate was obtained from 3M Company, St. Paul, Minn. It is also available from Union Carbide, Danbury, Conn.

Example 1

An extrusion die made of type SS15-5 stainless steel which had been coated with an epoxy silane low-energy coating and an acrylic primer as described in Example 1 of U. S. patent application Ser. No. 08/659,053 (filed May 31, 1996), was used in this example. Briefly, the die had been coated with a fluorosilane low-energy coating using the following procedure.

Preparation of CARBOWAX 750 Acrylate:

CARBOWAX 750 is a polyethylene glycol monomethyl ether available from Union Carbide, Danbury, Conn. It is believed to have the approximate formula $CH_3O$—($CH_2CH_2O)_{16}$—H.

CARBOWAX 750 acrylate is the reaction product between Carbowax 750 and acrylic acid. The preparation of CARBOWAX 750 acrylate is described in Example 2 of U.S. Pat. No. 3,787,351 (Olson).

Preparation of Fluorochemical Oligomer:

A fluorochemical oligomer was prepared as described in Example 1, part A of U.S. Pat. No. 5,468,812 (Muggli).

Into an approximately 950 mL bottle was placed 75.0 g (0.120 mol) of N-ethyl-perfluoro(octane)sulfonamidoethyl methacrylate, 117.5 g (0.146 mol) of CARBOWAX 750 acrylate, 25.0 g (0.216 mol) of hydroxyethyl acrylate, 250 g of ethyl acetate solvent, 5.0 g (0.034 mol) of n-octylthiol, and 0.625 g of azo-bis-iso-butyronitrile. This represents a monomer mixture containing 34.5% fluoroaliphatic monomer, 54.0% organic solubilizing monomer, and 11.5% bifunctional monomer. The bottle and contents were deaerated under reduced pressure, purged with nitrogen, capped tightly, then heated and agitated in a shaker at 65° C. for 16 hours to afford a fluorochemical oligomer. The bottle was cooled, degassed under reduced pressure, purged with air, and used in the next step. The solution contained 48 wt-% of oligomer in ethyl acetate.

Preparation of Durable Low Energy Surface Polymer:

A durable, low energy surface polymer was prepared by mixing the following: 20.8 g of the 48 wt-% solution of the above fluorochemical oligomer in ethyl acetate; 76.67 g of γ-glycidoxypropyl trimethoxysilane; and 13.33 g of 30% triphenylsulfonium hexafluoroantimonate in γ-glycidoxypropyl trimethoxysilane.

In this formulation, the fluorochemical oligomer was present in an amount of 9.0 wt-%, the triphenylsulfonium hexafluoroantimonate was present in an amount of 3.6 wt-%, the γ-glycidoxypropyl trimethoxysilane (Z-6040) was present in an amount of 78.5 wt-%, and ethyl acetate was present in an amount of 8.9 wt-%.

Preparation of Primer Composition:

A primer composition was prepared by mixing the following: glycerol propoxy triacrylate (EBECRYL 53, from Radcure, Inc.)=53.8 wt-%; 1,6-hexanediol diacrylate (SR 238, from Sartomer Resins, Inc.)=33.1 wt-%; dipentaerythritol hydroxypentaacrylate (SR 399, from Sartomer Resins, Inc.)=5.5 wt-%; and IRGACURE 184 (1-hydroxycyclohexylphenyl ketone from Ciba-Geigy)=7.6 wt-%.

A grit-blasted (i.e., abraded) die component was primed with the primer composition. Following the application of the primer composition to the abraded component, the primer composition was cured using ultraviolet radiation. After the primer composition was cured on the die body, the primed surface was grit blasted again. Next, the durable low energy surface polymer composition was applied to the abraded, primed surface. After this composition was cured by exposure to UV light, the extrusion die had a low surface energy surface. Contact angle measurements of the surface with water, a 6.4% 2-butanone in water solution, and 100% 2-butanone gave contact angles of 100.1 degrees, 69.2 degrees, and 43.6 degrees, respectively.

This extrusion die had experienced a decrease in repellency during service. It was then coated with a 50 wt-% solution of $C_8F_{17}SO_2N(C_2H_5)CH_2CH_2CH_2Si(OCH_3)_3$ in reagent grade ethyl acetate. The solution was applied to just one-half of the spent low-energy coating by gently wiping with a tissue containing a few drops of the solution. After standing for fifteen minutes, any excess liquid film was gently wiped away with a clean tissue to leave a mirror-like finish on the polymer surface. The treatment was allowed to cure overnight in air under ambient conditions.

The coating was tested the next day by challenging it with 2-butanone, and observing the coating's repellent properties. Wetting the untreated portion of the spent low-energy coating with 2-butanone and then tilting the die so that the solvent ran off, left behind an overall wet surface which gradually dried as the solvent evaporated away. This indicated good wetting by the solvent, with the observation of a tendency for droplets of liquid to stick to the coating. When the same procedure was performed on the treated portion of the coating, a definite "dewetting" of the solvent (repulsion of the solvent by the low-energy surface) was noticed during run off with no droplets remaining on the surface. This was repeated with water with the same results. The repellency against both 2-butanone and water indicated that the low-energy coating was restored to its original condition.

This example demonstrates that improved repellency can be achieved by application of $C_8F_{17}SO_2N(C_2H_5)CH_2CH_2CH_2Si(OCH_3)_3$ to low-energy coatings after those coatings begin to lose some of their original repellency. In this example, approximately 12 hours to 14 hours at room temperature were required for cure to occur. If the treated surface is challenged with MEK before cure occurs, the $C_8F_{17}SO_2N(C_2H_5)CH_2CH_2CH_2Si(OCH_3)_3$ dissolves away with no improvement in repellency observed. This example also demonstrates that the rejuvenating coatings of this invention may be applied without catalyst.

In another experiment, three layers of $C_8F_{17}SO_2N(C_2H_5)CH_2CH_2CH_2Si(OCH_3)_3$ were applied to a spent die coating as described above. Each layer was allowed to cure before the next layer was applied. The smoothness of the treated surface was maintained (i.e., it was mirror-like). The repellency properties were observed to be even better than when a single layer was applied.

Example 2

An extrusion die made of SS15-5 type stainless steel, on which a repellent coating was applied according to the teachings in U.S. patent application Ser. No. 08/659,053 (filed May 31, 1996), as described above in Example 1, was purposely abraded by rubbing with a soft tissue saturated with MATCHPRINT 3 Negative Black Pigment dispersion. This material is available from Imation Corp., Oakdale, Minn. as Product No. 41-1200-4322-3. After thoroughly rubbing the pigment dispersion on the die coating, followed by wiping with a clean tissue saturated with 2-butanone, the repellency of the coating was ruined. This was determined by placing a drop of 2-butanone on the cleaned surface of the die coating. The solvent drop spread evenly in all directions, easily wetting the die coating.

One half the length of the die coating was gently wiped with a tissue wetted with a 50 wt-% solution of $C_8F_{17}SO_2N(C_2H_5)CH_2CH_2CH_2Si(OCH_3)_3$ reagent grade ethyl acetate. After a few minutes, during which time the solvent evaporated, an oily residue was gently wiped away to leave a mirror-like finish on the die coating. The treated coating was allowed to cure by standing in ambient air overnight. When challenged the next day with 2-butanone, the untreated die coating was easily wetted, as tested previously. However, when the die coating treated with the $C_8F_{17}SO_2N(C_2H_5)CH_2CH_2CH_2Si(OCH_3)_3$ was challenged in the same way, the drop of solvent was dramatically repelled into a ball which escaped by running off the coating surface. The treatment prevented the die coating from being wetted by the 2-butanone, and restored the damaged coating to "like new" condition. This example demonstrates that the low-energy coatings described in U.S. patent application Ser. No. 08/659,053, when abraded to reduce the contact angle of 2-butanone to 0°, can be restored to "like new" condition by use of $C_8F_{17}SO_2N(C_2H_5)CH_2CH_2CH_2Si(OCH_3)_3$. It also demonstrates cure of the rejuvenating coating without heating and without the use of a catalyst.

Example 3

A solution of ethanol/water (95:5) was adjusted to pH 4.5 with acetic acid. $C_8F_{17}SO_2N(C_2H_5)CH_2CH_2CH_2Si(OCH_3)_3$, 1.0 gram, was added to grams of the acidified ethanol/water solution, and allowed to stand for 5 minutes. Using a paper tissue, a few drops of this solution was wiped onto one half of a spent low-energy coating (on stainless steel, previously primed and coated as described in Example 1, and spent as a result of use), and allowed to dry for 5 minutes. Excess fluorochemical was removed by gently wiping with a dry tissue, and the treated coating was placed in an oven at 100° C. for 15 minutes. After cooling, the treated surface was tested with 2-butanone as in Example 1. It was observed that the treated surface was dramatically more repellent than the untreated control. This example demonstrates that cure of the rejuvenating treatment composition can be enhanced by an acid catalyst and heat. This results in less "down time" for the extrusion die compared to the procedure described in Example 1.

When neat $C_8F_{17}SO_2N(C_2H_5)CH_2CH_2CH_2Si(OCH_3)_3$ was applied to a spent surface (without acidification), and heated the same way, repellency to MEK after 20 minutes of cooling was not as good, and most of the coating could be dissolved away by the solvent.

Comparative Example 1

An SS15-5 stainless steel ingot, measuring 24 millimeter x 150 millimeter (6 millimeter thick), was grit blasted using 20 micron silicon carbide powder. After a thorough cleaning, the water contact angle on the ingot was close to 0° (not measurable because the water readily wetted the metal surface and rapidly spread). The ingot was coated with a 20 wt-% solution of $C_8F_{17}SO_2N(C_2H_5)CH_2CH_2CH_2Si(OCH_3)_3$ in ethanol/water (95:5); the pH ethanol/water solution had been previously adjusted to 4.5 with acetic acid. The coating was applied to the unprimed bare metal by gently wiping the ingot with a soft tissue containing a few drops of the solution. After allowing the treatment composition to air dry for a minute, the coated ingot was placed in a 50° C. oven for 50 minutes. After cooling for 1 hour, the ingot was tested for water repellency by a measuring the water contact angle, which was 101° to 1240. The treatment could not be detected on the metal visually. That is, no color or gloss difference could be seen, even when viewed at different angles. Repellency to 2-butanone was apparent, but not dramatic, and certainly not good enough for use as a repellent coating for organic solvent-based liquids.

Comparative Example 2

Better repellency was observed when the ingot of Comparative Example 1 was coated a second time and cured as described. However, the greater build-up of fluorochemical was now visible, and could be seen as a darkening of the light gray metal surface. The water contact angle was 101°. Repellency was observed to be better, possibly because of a build-up of coating, yielding a smoother surface. Repellency to 2-butanone could be detected, but was not sufficient for use as a die coating.

Comparative Examples 1 and 2 both suggest a difference in repellency of water compared to repellency of 2-butanone of the rejuvenated coating of the present invention on bare metal. That is, water is clearly repelled, but 2-butanone is not. This can be explained by the difference in surface tensions of the two liquids. Water has a high surface tension of about 73 dynes/centimeter at 20° C., and is repelled by surfaces with a lower surface tension. 2-Butanone, on the other hand, has a surface tension of only 24 dynes/centimeter at 20° C., and will wet a surface that has a higher surface tension. If the metal surfaces of these examples has a surface tension below that of water, but above that of 2-butanone (that is, if the surface energy of the coated metal is between 24 dynes/centimeter and 73 dynes/centimeter), then it would be expected that water would be repelled, but 2-butanone would not. For the rejuvenated coatings on metal, we can say that the surface tension is above 24 dynes/centimeter, which is not low enough for use on extrusion dyes.

Comparative Example 3

A stainless steel ingot, grit blasted and cleaned as described in Comparative Example 1, was wiped with a 50 wt-% solution of $C_8F_{17}SO_2N(C_2H_5)CH_2CH_2CH_2Si(OCH_3)_3$ in reagent grade ethyl acetate, and allowed to air dry and cure under ambient conditions overnight. The next day it was observed that the residue was still liquid, and had not cured. The excess liquid was wiped away with a clean tissue, and the ingot allowed to stand in air for an additional 48 hours. Examination then found that the visible treatment was fully cured, but had a water contact angle of only 76°. Repellency to 2-butanone was not very good.

Comparative Example 4

An ingot as described in Comparative Example 1 was treated with a 40 wt-% solution of $C_8F_{17}SO_2N(C_2H_5)CH_2CH_2CH_2Si(OCH_3)_3$ in ethanol/water (95:5), pH adjusted to 4.5 with acetic acid, and cured in a 50° C. oven for one hour. After cooling for an additional one hour, it was noticed that the treatment was visible as a darkening of the light gray metal surface. The cured rejuvenated coating had a water contact angle of 125°; however, 2-butanone was poorly repelled, and had no measurable contact angle.

Example 4

An ingot made of type SS15-5 stainless steel was coated with an acrylic primer overcoated with a fluorosilane low-energy coating as described in a Example 1. This coating was very repellent, having a contact angle of 113° with water and 33° with 2-butanone. The coating was purposely abraded by rubbing with a soft tissue saturated with MATCHPRINT 3 Negative Black Pigment dispersion, using good hand pressure. After wiping with a clean tissue saturated with 2-butanone, the surface was found to have lost its repellency and exhibited contact angles near 0° for both water and 2-butanone.

This cleaned, nonrepellent coating was then used to simulate such a coating on an extrusion die that has lost its repellency due to abrasion. A solution consisting of 0.40 gram of $C_8F_{17}SO_2N(C_2H_5)CH_2CH_2CH_2Si(OCH_3)_3$ in 1.6 gram reagent grade ethyl acetate was catalyzed with 0.03 gram trifluoromethanesulfonic acid. This solution was then wiped onto the abraded coating, using a tissue; after the solvent evaporated away, a slight hazy residue was observed on the coating. After 5 minutes, the residue was removed by gently wiping with a tissue saturated with 2-butanone. After the rejuvenating coating was thoroughly cleaned of any residues by rinsing with excess 2-butanone, and gently wiping with a soft tissue, no visible change could be seen between the rejuvenated coating and a portion of the coating that had not been treated. The rejuvenated coating was found to have excellent repellency, having water and 2-butanone contact angles of 98° and 32°, respectively. These contact angles are tabulated below.

| | Contact Angles | | |
|---|---|---|---|
| Solvent | Original Coating | After Abrasion | Rejuvenated Coating |
| 2-Butanone | 33° | 0° | 32° |
| Water | 113° | 0° | 98° |

This experiment demonstrates the restoration of the repellency to a simulated spent low-energy coating with a room temperature treatment of a fluorosilane catalyzed by trifluoromethanesulfonic acid. The treatment is useful because it is both convenient and rapid. Using this process, the conditions are mild, no heating is necessary, and the surface modification is invisible.

When repeated, but using one half the amount of catalyst (0.75 wt-%), the same good repellency was obtained.

Example 5

Two refurbished samples of Example 4 were submerged for one week in a bath of (a) water and (b) 2-butanone. The ingots were then removed from their respective baths and allowed to dry in a 60° C. oven for 1 hour. Contact angles were then measured after cooling, and are reported in the table below. These samples were then treated again as in Example 4 and the contact angles measured. These measurements are summarized in the table below.

| Water and 2-Butanone Contact Angles Before and After Soaking in Baths of Water and 2-Butanone | | |
|---|---|---|
| Surface | Water | 2-Butanone |
| Virgin Low-Energy Coating | 113° | 33° |
| After Abrasion of Low-Energy Coating | 0° | 0° |
| After Treating Abraded Surface | 98° | 32° |
| After Soaking Treated Surface for One Week In Water | 105° | 10° |
| After Soaking Treated Surface for One Week In 2-Butanone | 109° | 6° |
| After Second Treatment | 93° | 33° |

This example demonstrates that after long-term immersion, the refurbishing treatment maintains good water repellency, but repellency of MEK is compromised. An additional refurbishment after the soak then restores the repellency of the surfaces.

Example 6

A spent low-energy coating on stainless steel prepared as described in Example 1 that had lost its repellency was treated with a fluorosilane solution containing different concentrations of catalyst. The fluorosilane solution consisted of 20 wt-% $C_8F_{17}SO_2N(C_2H_5)CH_2CH_2CH_2Si(OCH_3)_3$ in reagent grade ethyl the concentration of trifluoromethanesulfonic acid catalyst varied as listed in the table below. Each sample solution was wiped onto the spent low-energy surface, and allowed to cure for 5 minutes. Excess material was then rinsed away with 2-butanone, and the surface rubbed clean with a tissue saturated with 2-butanone. The dried surface was then tested for repellency by flowing a stream of 2-butanone over it, and observing any repellency of the solvent. The treatment was considered effective if it was not dissolved away by the 2-butanone, and exhibited good repellency to a variety of organic solvents (acetone, ethyl acetate, 2-butanone).

| Sample | Acid Catalyst Concentration | Effectiveness |
| --- | --- | --- |
| A | 0.75% | good permanent repellency |
| B | 0.30% | good permanent repellency |
| C | 0.10% | good permanent repellency |
| D | 0.05% | good permanent repellency |
| E | 0.01% | partial repellency; not effective |
| F | 0.00% | no repellency; not effective |

It can be seen from the above results that a catalyst concentration as low as 0.05 wt-% (Sample D) will accelerate curing of the fluorosilane fast enough to make a room temperature cure practical. When no catalyst is present there is insufficient cure and bonding to the surface within 5 minutes (Sample F, Control). The $C_8F_{17}SO_2N(C_2H_5)CH_2CH_2CH_2Si(OCH_3)_3$ is simply dissolved away by the 2-butanone wash. Sample E at 0.01 wt-% catalyst concentration produces borderline repellency in 5 minutes. The degree of catalysis is apparently dependent on the silanol concentration of the substrate, because all of the above solutions, including the control with no catalyst, were effective on glass.

Example 7

In order to determine if acids, other than trifluoromethanesulfonic acid and acetic acid, can be used to catalyze cure of a fluorosilane on a spent low-energy coating, the following compositions using common acids were prepared and tested. In all cases the catalyzed solution included 20 wt-% $C_8F_{17}SO_2N(C_2H_5)CH_2CH_2CH_2Si(OCH_3)_3$ in reagent grade ethyl acetate, and cure was carried out at ambient temperatures for 10 minutes. The identification and amount of each acid catalyst in weight percents are listed in the table below.

A low-energy coating was coated onto a glass microscope slide by flow coating, which was then cured by exposing the coated slides to UV light. The cured coating on the microscope slide was abraded by rubbing with a paste of scouring powder until the coating no longer repelled water. Each solution was coated onto the spent low-energy coating.

| Sample | Catalyst | Results |
| --- | --- | --- |
| A | 0.31% HCl (Hydrochloric Acid) | good cure and repellency |
| B | 1.25% $CH_3COOH$ (Acetic Acid) | good cure and repellency |
| C | 1.25% $H_3PO_4$ (Phosphoric Acid) | coagulation, unsatisfactory |
| D | 1.25% HCOOH (Formic Acid) | good cure and repellency |
| E | 1.25% $CH_3CH(OH)COOH$ (Lactic Acid) | good cure and repellency |
| F | 0.10% $H_3PO_4$ (Phosphoric Acid) | good cure and repellency |

The above results demonstrate that most common organic and mineral acids will catalyze the cure and bonding of the fluorosilane, and that trifluoromethanesulfonic acid is not a special case in this regard. Phosphoric acid caused the solution to coagulate at 1.25 wt-%, and was unsatisfactory at that concentration; however, when a much lower concentration of the acid was used (0.1 wt-%, Sample F), good cure and repellency resulted. Therefore, the room temperature cure of $C_8F_{17}SO_2N(C_2H_5)CH_2CH_2CH_2Si(OCH_3)_3$ may be catalyzed by any soluble organic or inorganic (i.e., mineral) acid, weak or strong, at low concentrations. This enables use of less hazardous acids for the application, making the rejuvenation process safer and easier to use in practical applications.

Example 8

Orthophosphoric Acid, $H_3PO_4$, 0.050 gram was weighed into a 125 ml Erlenmeyer flask. Reagent grade ethyl acetate, 50 grams, was then added, and the flask was stoppered and shaken to dissolve the acid. Separately, a solution of $C_8F_{17}SO_2N(C_2H_5)CH_2CH_2CH_2Si(OCH_3)_3$ was prepared by dissolving 2 grams of $C_8F_{17}SO_2N(C_2H_5)CH_2CH_2CH_2Si(OCH_3)_3$ in 5 grams reagent grade ethyl acetate. To prepare the treatment solution, equal weights of the two solutions were mixed, and applied to one half of a spent low-energy coating on stainless steel, which had been primed and coated as described in Example 1, by wiping with a soft tissue, or by painting with a brush. After evaporation of the solvent, the rejuvenating coating was allowed to cure for 10 minutes. Excess coating was then gently washed away with 2-butanone and wiped with a tissue saturated with 2-butanone. After this cleaning step, the treated portion of the spent low-energy coating looked exactly the same as the untreated portion (treatment is invisible) and exhibited excellent dewetting (repellency) of MEK and other organic solvents. The untreated portion of the spent low-energy coating exhibited no repellency towards the organic solvents; rather, the solvents formed sheets over the spent low-energy coating with good wetting. For best results, it was observed that the phosphoric acid solution and the $C_8F_{17}SO_2N(C_2H_5)CH_2CH_2CH_2Si(OCH_3)_3$ solution should be freshly prepared for each use, and the combined solutions used within a week.

Comparative Example 5

The low-energy coating described in U.S. patent application Ser. No. 08/659,053 (filed May 31, 1996) makes use of an acrylic primer coat to improve bonding of the low-energy coating. The primer coat does not contain silicon compounds. In order to see if a treatment composition of the present invention would endow the primer coat with repellency properties, the following experiment was carried out.

A stainless steel ingot was. coated as described in Comparative Example 1. After cure, half of the shiny acrylic coating was grit blasted with 20 micron silicon carbide to produce a nonglossy surface. Both surfaces were then wiped with a 15 wt-% solution of $C_8F_{17}SO_2N(C_2H_5)CH_2CH_2CH_2Si(OCH_3)_3$ in reagent grade ethyl acetate, catalyzed with HCl (0.31 wt-%). After allowing the solvent to evaporate off, and allowing cure to take place for 10 minutes, the samples were cleaned by rinsing with MEK, and the effectiveness of the coating noted. Examination revealed no repellency. All of the fluorochemical was washed away in the rinse; no bonding took place.

This example demonstrates that the treatment composition of the present invention is useful only on substrates containing silicon atoms in its structure. Substrates devoid of silicon appear not to be suitable for treatment. Glass is effectively treated, and polymers containing silicon are also effectively treated.

The complete disclosure of all patents, patent documents, and publications cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A process of treating a silicon-containing organic polymeric surface, the process comprising treating the surface with a treatment composition comprising a fluorinated silane having the following formula:

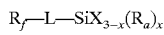

wherein: $R_f$ is a fluoroaliphatic group containing a perfluorinated terminal group; L is a covalent bond, a heteroatom, or an organic linking group; $R_a$ is an alkoxy group, an alkyl group, or an acyloxy group; X is a halide; and x is 0 to 3, with the proviso that when $R_a$ is an alkyl group, x is not 3.

2. The process of claim 1 wherein $R_a$ of the fluorinated silane is a perfluoroalkyl group of the formula $C_nF_{2n+1}$ wherein n is about 6 to about 12.

3. The process of claim 2 wherein the fluorinated silane is selected from the group of $C_8F_{17}SO_2N(C_2H_5)$ $CH_2CH_2CH_2Si(OCH_3)_3$, $C_8F_{17}SO_2N(C_2H_5)CH_2CH_2CH_2Si$ $(OC(O)CH_3)_3$, $C_8F_{17}SO_2N(C_2H_5)CH_2CH_2CH_2SiCl_3$, $C_8F_{17}SO_2N(CH_3)CH_2CH_2CH_2Si(CH_3)Cl_2$, $C_8F_{17}SO_2N$ $(CH_3)CH_2CH_2CH_2Si(OCH_3)_3$, $C_8F_{17}CH_2CH_2NHCH_2CH_2CH_2Si(OCH_3)_3$, and mixtures thereof.

4. The process of claim 3 wherein the fluorinated silane is $C_8F_{17}SO_2N(C_2H_5)CH_2CH_2CH_2Si(OCH_3)_3$.

5. The process of claim 1 wherein the step of treating is carried out at room temperature.

6. The process of claim 5 further comprising a step of thermally curing the treatment composition.

7. The process of claim 1 wherein the treatment composition comprises no greater than about 50 wt-% of the fluorinated silane, based on the total weight of the treatment composition.

8. The process of claim 1 wherein the polymeric surface is treated with the treatment composition comprising a fluorinated silane for less than about 10 minutes.

9. The process of claim 1 wherein the treatment composition comprising the fluorinated silane further comprises a solvent.

10. The process of claim 1 wherein the treatment composition comprising the fluorinated silane further comprises a catalyst.

11. The process of claim 10 wherein the catalyst is an acid catalyst.

12. The process of claim 11 wherein the acid catalyst is selected from the group of trifluoromethylsulfonic acid, hydrochloric acid, lactic acid, sulfuric acid, phosphoric acid, acetic acid, formic acid, and mixtures thereof.

13. The process of claim 12 wherein the acid catalyst is phosphoric acid.

14. The process of claim 13 wherein the step of treating is carried out at room temperature with no subsequent thermal curing step.

15. A process of restoring the repellency of a spent, fluorosilane-containing, low-energy coating, the process comprising treating the spent coating with a treatment composition comprising a fluorinated silane having the following formula:

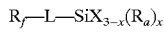

wherein: $R_f$ is a fluoroaliphatic group containing a perfluorinated terminal group; L is a covalent bond, a heteroatom, or an organic linking group; $R_a$ is an alkoxy group, an alkyl group, or an acyloxy group; X is a halide; and x is 0 to 3, with the proviso that when $R_a$ is an alkyl group, x is not 3.

16. The process of claim 15 wherein the low-energy coating comprises polymeric compounds which comprise a fluorochemical oligomer comprising pendant fluoroaliphatic groups, pendant organic-solubilizing groups, and pendant groups reacted with an epoxy-silane.

17. The process of claim 16 wherein the fluorochemical portion of the low-energy coating of the polymer comprises an oligomeric aliphatic backbone having bonded thereto: (i) a fluoroaliphatic group having a perfluorinated terminal group; (ii) an organic-solubilizing group comprising a plurality of carbon atoms and optionally comprising one or more catenary oxygen atoms; and (iii) an organic functional group capable of reacting with an epoxy-silane, each fluoroaliphatic group, organic-solubilizing group, and group capable of reacting with an epoxy-silane being independently bonded to the oligomeric aliphatic backbone through a covalent bond, a heteroatom, or an organic linking group.

18. The process of claim 17 wherein the fluorochemical portion of the low-energy coating comprises one or more oligomers represented by the following formula:

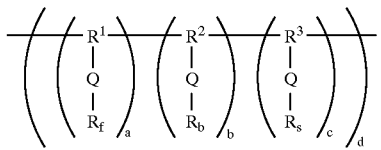

wherein: $R^1$, $R^2$, and $R^3$ respectively represent polymerized units derived from fluorinated, bifunctional, and solubilizing monomers and together form an aliphatic backbone; each Q independently is a covalent bond, a heteroatom, or an organic linking group; $R_f$ is a fluoroaliphatic group containing a perfluorinated terminal group; $R_b$ is an organic functional group capable of reacting with an epoxy silane; $R_s$ is an organic-solubilizing group comprising a plurality of carbon atoms and optionally comprising one or more catenary oxygen atoms; a, b, c, and d, are integers such that the compound is oligomeric; and the epoxy-silane is represented by

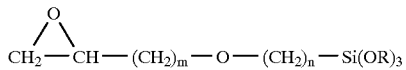

and

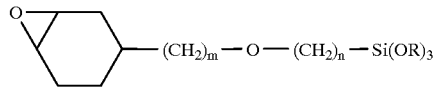

where m and n are integers from 1 to 4; and R is an aliphatic group of less than 10 carbon atoms; an acyl group of less than 10 carbon atoms; or a group of the formula $(CH_2CH_2O)_jZ$ in which j is an integer of at least 1; and Z is an aliphatic group of less than 10 carbon atoms.

19. A process of restoring the repellency of a spent low-energy coating, wherein the low-energy coating comprises polymeric compounds which comprise a fluorochemical oligomer comprising pendant fluoroaliphatic groups, pendant organic-solubilizing groups, and pendant groups reacted with an epoxy-silane, the process comprising: applying a treatment composition to the spent low-energy coating under conditions effective to improve the repellency of the spent low-energy coating, wherein the treatment composition comprises a fluorochemical compound.

20. The process of claim 19 wherein the fluorochemical compound includes one or more chemical groups selected from the group of isocyanates, silanes, epoxides, polyalkoxy-alkylmelamines, anhydrides, carbodiimides, aziridines, chloroformates, and activated halides.

21. The process of claim 19 wherein the fluorochemical compound includes one or more silane groups that are reactive with sites on the polymer of the spent, fluorosilane-containing, low-energy coating.

22. The process of claim 21 wherein the fluorochemical compound is a fluorinated silane that includes an organic moiety optionally containing heteroatoms or functional groups.

23. The process of claim 22 wherein the fluorinated silane has the following formula:

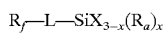

wherein: $R_f$ is a fluoroaliphatic group containing a perfluorinated terminal group; L is a covalent bond, a heteroatom, or an organic linking group; $R_a$ is an alkoxy group, an alkyl group, or an acyloxy group; X is a halide; and x is 0 to 3, with the proviso that when $R_a$ is an alkyl group, x is not 3.

24. The process of claim 23 wherein $R_f$ of the fluorinated silane is a perfluoroalkyl group of the formula $C_nF_{2n+1}$ wherein n is about 6 to about 12.

25. The process of claim 24 wherein the fluorinated silane is selected from the group of $C_8F_{17}SO_2N(C_2H_5)CH_2CH_2CH_2Si(OCH_3)_3$, $C_8F_{17}SO_2N(C_2H_5)CH_2CH_2CH_2Si(OC(O)CH_3)_3$, $C_8F_{17}SO_2N(C_2H_5)CH_2CH_2CH_2SiCl_3$, $C_8F_{17}SO_2N(CH_3)CH_2CH_2CH_2Si(CH_3)Cl_2$, $C_8F_{17}SO_2N(CH_3)CH_2CH_2CH_2Si(OCH_3)_3$, $C_8F_{17}CH_2CH_2NHCH_2CH_2CH_2Si(OCH_3)_3$, and mixtures thereof.

26. The process of claim 25 wherein the fluorinated silane is $C_8F_{17}SO_2N(C_2H_5)CH_2CH_2CH_2Si(OCH_3)_3$.

27. The process of claim 19 wherein the step of treating is carried out at room temperature.

28. The process of claim 27 further comprising a step of thermally curing the treatment composition.

29. The process of claim 19 wherein the treatment composition comprising the fluorochemical further comprises a solvent.

30. The process of claim 29 wherein the treatment composition comprising the fluorochemical compound further comprises a catalyst.

31. The process of claim 30 wherein the catalyst is an acid catalyst.

32. The process of claim 31 wherein the acid catalyst is selected from the group of trifluoromethylsulfonic acid, hydrochloric acid, lactic acid, sulfuric acid, phosphoric acid, acetic acid, formic acid, and mixtures thereof.

33. The process of claim 32 wherein the acid catalyst is phosphoric acid.

34. The process of claim 33 wherein the step of treating is carried out at room temperature with no subsequent thermal curing step.

35. A process of restoring the repellency of a spent low-energy coating, wherein the low-energy coating comprises polymeric compounds which comprise a fluorochemical oligomer comprising pendant fluoroaliphatic groups, pendant organic-solubilizing groups, and pendant groups reacted with an epoxy-silane, the process comprising:
   applying a treatment composition to the surface of the spent low-energy coating, wherein the treatment composition comprises a fluorochemical compound;
   allowing the treatment composition to dry for less than about 30 minutes; and
   removing excess treatment composition with an organic solvent.

36. The process of claim 35 wherein the steps of applying the treatment composition, allowing it to dry, and removing excess treatment composition are repeated.

37. The process of claim 35 wherein the steps of applying the treatment composition, allowing it to dry, and removing excess treatment composition are each carried out at room temperature.

38. A process for reducing the surface energy of an article comprising a silicon-containing organic polymeric surface, the process comprising applying a treatment composition to the silicon-surface, the process comprising applying a treatment composition to the silicon-containing organic polymeric surface, under conditions effective to reduce the surface energy of the silicon-containing organic polymeric surface; wherein the treatment composition comprises a fluorinated silane having the following formula:

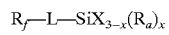

wherein:
   $R_f$ is a fluoroaliphatic group containing a perfluorinated terminal group;
   L is a covalent bond, a heteroatom, or an organic linking group;
   $R_a$ is an alkoxy group, an alkyl group, or an acyloxy group;
   X is a halide;
   and x is 0 to 3, with the proviso that when $R_a$ is an alkyl group, x is not 3.

39. The process of claim 38 further comprising the steps of:
   allowing the treatment composition to dry for less than about 30 minutes; and
   removing excess treatment composition from the surface.

40. The process of claim 39 wherein the steps of applying the treatment composition, allowing it to dry, and removing excess treatment composition are each carried out at room temperature.

41. The process of claim 38 wherein the article being treated is one of a coating die, a coating edge guide, and a nozzle.

42. A process for making a coated article comprising:
   providing a substrate, a liquid, and an apparatus for coating the liquid onto the substrate, the apparatus comprising a silicon-containing organic polymeric surface which contacts the liquid when the liquid is coated onto the substrate;
   applying to the silicon-containing organic polymeric surface of the apparatus a composition comprising a fluorinated silane having the following formula:

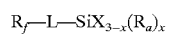

wherein:
   $R_f$ is a fluoroaliphatic group containing a perfluorinated terminal group;
   L is a covalent bond, a heteroatom, or an organic linking group;
   $R_a$ is an alkoxy group, an alkyl group, or an acyloxy group;
   X is a halide; and x is 0 to 3, with the proviso that when $R_a$ is an alkyl group, x is not 3; and coating the liquid onto the substrate with the apparatus.

43. The process of claim 42 further comprising the steps of: allowing the composition to at least partially dry; and removing excess composition from the surface of the substrate.

44. The process of claim 42 wherein the coated article comprises one of a medical imaging material, an image setting material, an industrial imaging material, or a data storage material.

45. An article comprising a substrate and a rejuvenated fluorosilane-containing, low-energy coating comprising a polymeric compound that comprises a fluorochemical oligomer portion comprising pendant fluoroaliphatic groups, pendant organic-solubilizing groups, and pendant groups reacted with an epoxy-silane, wherein the pendant groups reacted with an epoxy-silane have been further reacted with a compound selected from the group consisting of fluorinated silanes, fluorinated isocyanates, fluorinated epoxides, fluorinated polyalkoxy-alkylmelamines, fluorinated anhydrides, fluorinated carbodiimides, fluorinated aziridines, fluorinated chloroformates or fluorinated activated halides.

* * * * *

UNITED STATES PATENT AND TRADEMARK OFFICE
CERTIFICATE OF CORRECTION

PATENT NO.    : 5,980,992
DATED         : November 9, 1999
INVENTOR(S)   : Kistner et al.

It is certified that error appears in the above-identified patent and that said Letters Patent is hereby corrected as shown below:

Column 14,
Line 58, "300" should read -- 30º --.
Line 61, "300" should read -- 30º --.

Column 15,
Line 42, "A-1 87" should read -- A-187 --.

Column 17,
Line 44, "reagent" should read -- in reagent --.

Column 18,
Line 1, "to grams" should read -- to 59 grams --.
Line 32, after "pH", insert -- of the --.
Line 39, "by a measuring" should read -- by measuring --.
Line 40, "1240" should read -- 124º --.

Column 19,
Line 41, "in a Example" should read -- in Example --.

Column 20,
Line 56, after "ethyl", insert -- acetate; --.

Column 26,
Lines 15 and 16, delete "silicon-surface, the process comprising applying a treatment composition to the".

Signed and Sealed this

Twelfth Day of August, 2003

JAMES E. ROGAN
*Director of the United States Patent and Trademark Office*